Patented Oct. 31, 1944

2,361,552

UNITED STATES PATENT OFFICE 2,361,552

ALPHA DICHLORO-BETA MONOCHLOROPROPIONYL CHLORIDE

Joy G. Lichty, Stow, Ohio, assignor to Wingfoot Corporation, Akron, Ohio, a corporation of Delaware No Drawing. Application September 22, 1942, Serial No. 459,300

1 Claim. (Cl. 260—544)

This invention relates to a trihalopropionyl halide, especially trichloropropionyl chloride. It includes the new compound and its preparation.

The preferred method of preparing trichloropropionyl chloride involves treating trichloropropionic acid with sulfur chloride and chlorine in the presence of a catalyst, such as zinc chloride or other metal chloride catalyst, as for example $SbCl_3$ or $AlCl_3$.

Trichloropropionyl chloride may be formed by either of the following methods:

Example 1

According to one method of preparation the trichloropropionyl chloride is produced according to the following equation:

$$Ch_2Cl.CCl_2.COOH + SOCl_2 \rightarrow Ch_2Cl.CCl_2.COCl + HCl + SO_2$$

Twenty cc. of dimethyl aniline were gradually added to a solution of 374 grams of trichloropropionic acid and 420 cc. of thionyl chloride at about the reflux temperature. The dimethyl aniline catalyzes the reaction. Other catalysts which may be used include quinoline, triethylamine, triamylamine, etc. Heating on a steam bath was continued for a total of eight hours. It was apparent from the appearance of the reaction, the evolution of hydrogen chloride, etc., that the reaction was practically complete after three hours. Distillation gave a substantially 100 per cent yield of trichloropropionyl chloride boiling at 63-5° C./28 mm. $N_D^{25} 1.4861$. The temperature of the reaction may, of course, be varied.

Example 2

This process follows the equation given below:

$$4CH_2Cl.CCl_2.COOH + S_2Cl_2 + 3Cl_2 \xrightarrow{(ZnCl_2)} 4CH_2Cl.CCl_2.COCl + 2SO_2 + 4HCl$$

A suspension of 48 grams of zinc chloride in a solution of 332 grams of sulfur monochloride in 355 grams of trichloropropionic acid was stirred and heated under reflux to a temperature of 70–85° C. Chlorine was bubbled into the mixture under these conditions for a period of twenty hours. This gave a satisfactory yield of trichloropropionyl chloride boiling at 70-72° C./30 mm. The residue from the distillation was retreated with sulfur chloride and chlorine to produce more trichloropropionyl chloride, and the yield was thus improved.

Although no solvent is used in the examples, a solvent may be employed where desired.

By the second method one may not only convert the carboxyl groups to acid chloride groups, but may also replace one or two hydrogens on the alpha carbon atoms. Either beta monochloro or alpha, beta dichloro propionic acid may thus be converted to trichloropropionyl chloride.

Although the specification describes trichloropropionyl chloride, tribromopropionyl bromide may be similarly prepared.

What I claim is:

Alpha dichloro-, beta monochloropropionyl chloride.

JOY G. LICHTY.